US012760845B2

(12) United States Patent
Minas

(10) Patent No.: US 12,760,845 B2
(45) Date of Patent: Oct. 13, 2026

(54) METHODS AND APPARATUS FOR PRESSURE CONTROL SYSTEMS IN PRESSURE VESSELS

(71) Applicant: General Electric Company, Schenectady, NY (US)

(72) Inventor: Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 570 days.

(21) Appl. No.: 18/364,299

(22) Filed: Aug. 2, 2023

(65) Prior Publication Data

US 2025/0043919 A1 Feb. 6, 2025

(51) Int. Cl.
*F17C 13/02* (2006.01)
*F17C 13/04* (2006.01)

(52) U.S. Cl.
CPC ............ *F17C 13/025* (2013.01); *F17C 13/04* (2013.01); *F17C 2205/0326* (2013.01); *F17C 2223/0161* (2013.01); *F17C 2250/043* (2013.01); *F17C 2250/0439* (2013.01); *F17C 2250/0626* (2013.01); *F17C 2250/072* (2013.01)

(58) Field of Classification Search
None
See application file for complete search history.

(56) References Cited

U.S. PATENT DOCUMENTS 3,650,290 A * 3/1972 Moen .................... F17C 13/025 137/339
5,590,535 A 1/1997 Rhoades
7,690,208 B2 4/2010 Immel
7,900,434 B2 3/2011 Grayson et al.
8,597,849 B2 12/2013 Junge et al.
8,783,281 B2 * 7/2014 Carter ................ F02M 21/0245 123/304
9,482,195 B2 * 11/2016 Archer ............... F02M 21/0287
10,088,108 B2 * 10/2018 Jansson ...................... F17C 5/02
11,448,133 B2 9/2022 Cocks et al.
2012/0060935 A1 * 3/2012 Carter ................... F02D 19/023 137/511

(Continued)

FOREIGN PATENT DOCUMENTS

CA 2653643 C * 8/2010 ............ F02M 21/06
CN 110716590 A 1/2020

(Continued)

*Primary Examiner* — Jenna M Maroney
(74) *Attorney, Agent, or Firm* — Hanley, Flight & Zimmerman, LLC

(57) ABSTRACT

Methods and apparatus for pressure control systems in pressure vessels include an example apparatus including a cryogenic tank, a valve fluidly coupled to the cryogenic tank, machine readable instructions, and programmable circuitry to at least one of instantiate or execute the machine readable instructions to determine, based on a temperature of the cryogenic tank and a property of the cryogenic tank, a threshold pressure of the cryogenic tank, compare a pressure of the cryogenic tank to the threshold pressure, and after determining the pressure of the cryogenic tank does not satisfy the threshold pressure, actuate the valve until the pressure satisfies the threshold pressure.

17 Claims, 8 Drawing Sheets

(56) References Cited

U.S. PATENT DOCUMENTS

| | | | | |
|---|---|---|---|---|
| 2014/0174105 | A1* | 6/2014 | Gerstler | F25J 1/0244 62/48.2 |
| 2017/0159611 | A1* | 6/2017 | Porter | F17C 9/02 |
| 2017/0291486 | A1* | 10/2017 | Tanaka | H01M 8/04776 |
| 2021/0317953 | A1* | 10/2021 | Konfrst | F17C 7/04 |
| 2022/0243871 | A1 | 8/2022 | Adkins | |
| 2023/0098469 | A1* | 3/2023 | Bonnissel | F17C 13/026 141/4 |
| 2023/0107610 | A1 | 4/2023 | Minas et al. | |
| 2023/0108882 | A1* | 4/2023 | Montgomery | F17C 13/126 62/48.2 |

FOREIGN PATENT DOCUMENTS

| | | | | |
|---|---|---|---|---|
| CN | 113574308 | A | 10/2021 | |
| DE | 102011111774 | A1 * | 3/2012 | B60K 15/03 |
| DE | 102015002024 | A1 * | 8/2016 | F17C 13/02 |
| EP | 3896328 | A1 * | 10/2021 | F17C 13/026 |
| KR | 102476799 | B1 | 12/2022 | |

* cited by examiner

METHODS AND APPARATUS FOR PRESSURE CONTROL SYSTEMS IN PRESSURE VESSELS

FIELD OF THE DISCLOSURE

This disclosure relates generally to gas and liquid storage systems and, more particularly, to methods and apparatus for pressure control systems in pressure vessels.

BACKGROUND

Hydrogen storage systems include pressured and/or cooled hydrogen in liquid or gaseous forms. Hydrogen storage systems often include a number of components that contain and move hydrogen to other components of the system. Hydrogen storage systems can be used in power generation, in chemical manufacturing, among other applications.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
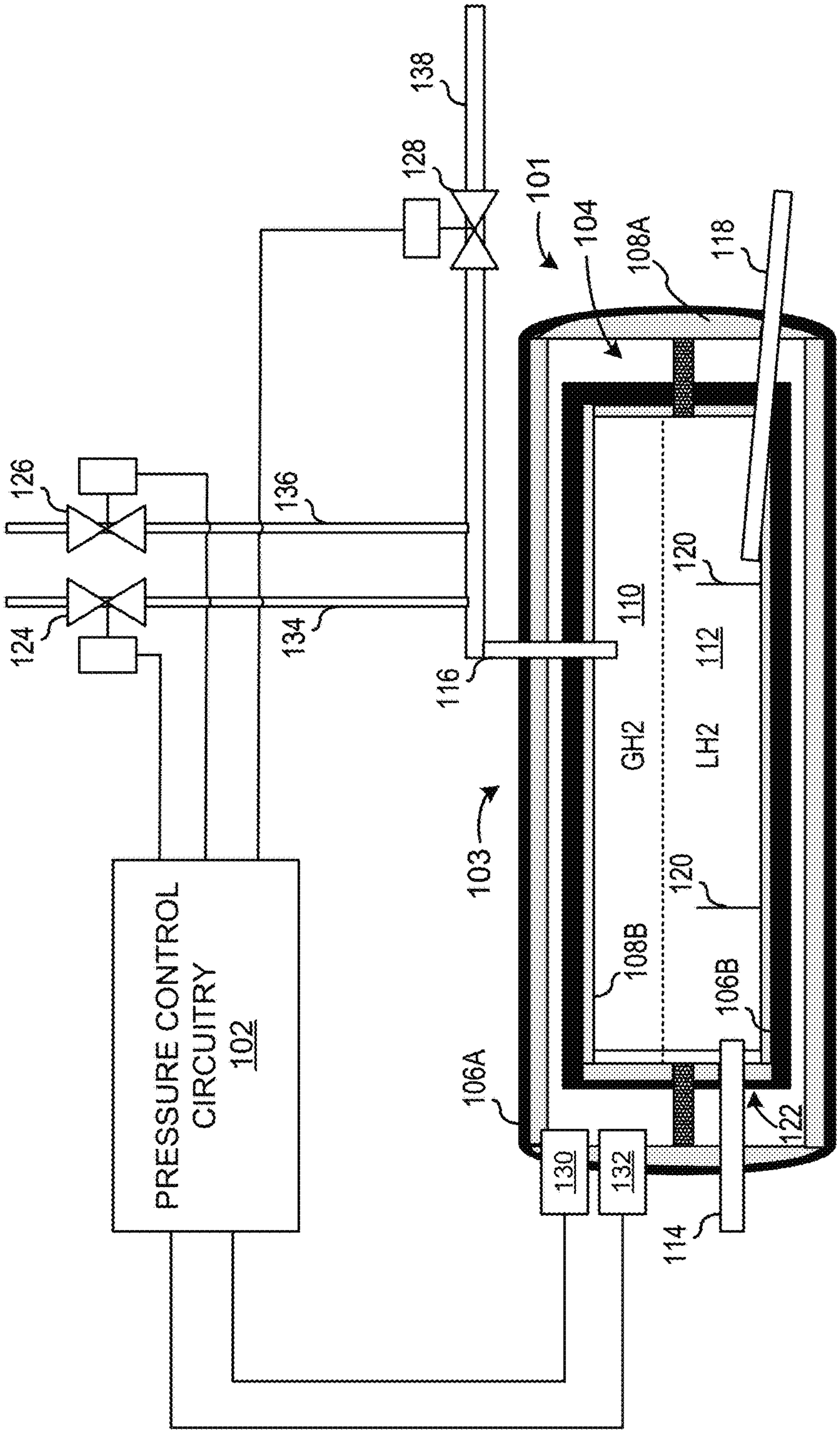
FIG. 1 is a schematic diagram of an example environment including a system implemented in accordance with the teachings of this disclosure.

The designed geometry (e.g., thickness, etc.) of a cryogenic pressure vessel is often determined by the conditions experienced by the cryogenic vessel during transient operations (e.g., during heat-up, during cool-down, etc.). That is, a cryogenic pressure vessel is designed to operate under a maximum allowable working pressure (MAWP) in all conditions. The MAWP of a cryogenic vessel is based on the material thickness, the geometry of the pressure vessel, the material properties of the pressure vessel (e.g., elastic modulus, yield strength, ultimate strength, etc.) at the most demanding expected operating condition, and the safety factor of the pressure vessel. The maximum operating pressure (MOP) of a pressure vessel of a cryogenic vessel is based on the properties of the pressure vessel, including material thickness, the geometry of the pressure vessel, the material properties of the pressure vessel (e.g., elastic modulus, yield strength, ultimate strength, etc.) at the current temperature of the vessel, and the safety factor of the pressure vessel. Because most materials become stronger at lower temperatures, the MAWP of a pressure vessel is typically determined by the material strength of the pressure vessel at the highest expected operational temperature (e.g., ambient temperature, etc.). At lower temperatures, the material strength of a cryogenic vessel increases, which causes the MOP to be higher at lower temperatures than at higher temperatures. Prior pressure vessels had thicknesses based on the strength of the pressure vessel during the higher temperatures of transient conditions. As such, prior pressure vessels operate significantly below the MOP of the pressure vessel during steady-state cryogenic conditions. Examples disclosed herein include pressure vessels with thicknesses designed to operate near the MOP of the pressure vessel during steady-state conditions. Examples disclosed herein include control systems that determine the MOP as a function of temperature. Examples disclosed herein include one or more control valves that vent hydrogen during transient operations to ensure the pressure vessel remains under the temperature-based dynamic MOP.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Cryogenic pressure vessels, such as liquid (LH2) cryo-vessels, have maximum allowable working pressures (MAWP), which is a static value that governs the allowable pressure of the substances stored therein. The MAWP of a cryogenic pressure vessel is based on industry and/or regulatory standards (e.g., the American Society of Mechanical Engineer (ASME) standards, etc.) and typically is associated with the highest expected operating temperature of the cryogenic pressure vessel (e.g., ambient temperature, etc.). In some examples, the MAWP of a pressure vessel is based on the material strength at the highest expected operating temperature of the pressure vessel, the geometry of the pressure vessel, the substance contained therein, and the safety factor of the vessel. For example, some LH2 tank cryo-vessels have a MAWP of 12 Bar (174 pounds per square inch (psi)). Cryogenic pressure vessels often include pressure safety valves (PSV), which are configured to release some of the substance from the vessel if the operating pressure of the pressure vessel exceeds a preset pressure (i.e., the MAWP, a pressure beneath the MAWP, etc.).

Pressure control systems are designed to operate the pressure vessel under the MAWP during both transient and steady-state operations. As used herein, steady-state operations refer to the operation of a pressure vessel at cryogenic temperatures (e.g., ~20K, etc.) and transient operations refer to the operation of pressure vessels above cryogenic temperatures (e.g., above 20K, etc.) and typically occur when hydrogen is being added or removed from the pressure vessel and/or when the temperature of the tank is being changed. During transient operations (e.g., filling the vessel, cooling the vessel, heating the vessel, etc.), vessels are often subjected to higher temperatures (e.g., above 20K, etc.) than during steady-stated operation. Because materials typically increase in strength at cryogenic temperatures (e.g., 20K, etc.), the geometry (e.g., the material thickness, etc.) of cryogenic pressure vessels is often determined based on the strength of the pressure vessels during transient operations. Accordingly, prior pressure vessels often operate substantially under (e.g., 50% under, 25% under, etc.) their actual strengths during steady-state conditions.

Example pressure vessel control systems disclosed herein enable pressure vessels to facilitate lighter vessel geometries than prior pressure control systems. Example pressure control systems disclosed herein determine a maximum operating pressure (MOP) of a pressure vessel based on the current temperature of the pressure vessel, the geometry of the pressure vessel (e.g., spherical, cylindrical, conical, etc.), and the material of the pressure vessel (e.g., aluminum, ceramic, etc.). In some examples disclosed herein, the MOP of a pressure vessel is less than or equal to the MAWP of the pressure vessel at steady-state cryogenic temperatures and decreases at higher temperatures. Examples disclosed herein include multiple valves that can be serially opened to maintain the operating pressure of the substance within the pressure vessel beneath the MOP during transient operations. In other examples disclosed herein, the pressure control systems include a modulated valve that can be modulated between various positions to adjust the vent rate of the substance within the pressure vessels. In some examples disclosed herein, a recapture system can be used to capture, process, and store vented material. In some examples disclosed herein, a look-up table relating the current temperature and the MOP can be determined analytically and stored by the pressure control system. Examples disclosed herein enable lighter pressure vessels while ensuring the pressure vessels operate within industry safety factors in all operating conditions.

FIG. 1 is a schematic diagram of an example pressure control system 100 including an example pressure vessel 101 implemented in accordance with the teachings of this disclosure. In the illustrated example of FIG. 1, the flow of hydrogen into and out of the pressure vessel 101 is controlled via example pressure control circuitry 102. In the illustrated example of FIG. 1, the pressure vessel 101 is a cryogenic hydrogen tank (e.g., a hydrogen tank, a cryogenic tank, etc.). In other examples, the pressure vessel 101 can contain any other suitable substance. While FIG. 1 illustrates a system for storing hydrogen, it should be appreciated storage systems implemented in accordance with the teachings of this disclosures can be used in conjunction with pressure vessels storing other cryogenic substances/materials (e.g., air, nitrogen, helium, neon, oxygen, fluorine, argon, methane, etc.).

In the illustrated example of FIG. 1, the pressure vessel 101 is a dual wall pressure vessel including an example the outer shell 103 and an example vacuum vessel 104. In the illustrated example of FIG. 1, the outer shell 103 includes an example first composite overwrap 106A and an example metallic liner 108A. In the illustrated example of FIG. 1, the vacuum vessel 104 includes an example second composite overwrap 106B and/or an example second metallic liner 108B. In the illustrated example of FIG. 1, the vacuum vessel 104 includes a first section 110 containing gaseous hydrogen (GH2) and a second section 112 including liquid hydrogen (LH2).

In the illustrated example of FIG. 1, an example LH2 fill pipe 114 (e.g., a pipe, etc.) can be used to fill the pressure vessel 101 with LH2. In the illustrated example of FIG. 1, an example GH2 extraction pipe 116 can be used to extract and/or vent GH2 from the pressure vessel 101, and an example LH2 extraction pipe 118 can be used to extract LH2 from the pressure vessel 101. In the illustrated example of FIG. 1, the second section 112 of the pressure vessel 101 includes example baffles 120 used to avoid liquid sloshing in the pressure vessel 101. In the illustrated example of FIG. 1, the baffles 120 are positioned vertically to mitigate the strong shaking of the liquid. In other examples, the baffles 120 can have any other orientation. In the illustrated example of FIG. 1, the vacuum vessel 104 includes multi-layer insulation (MLI) 122. For example, the MLI 122 can provide the required thermal performance given that such insulation can minimize heat transfer.

In some examples, the pressure vessel 101 has a steady-state operational temperature in a cryogenic range (e.g., between 25 K and 30 K, etc.). During transient operations, the pressure vessel 101 can have other operational temperatures (e.g., above 30 K, etc.). The properties of the materials of the pressure vessel 101 (e.g., the properties of the first composite overwrap 106A, the first metallic liner 108A, the second composite overwrap 106B, and/or the second metallic liner 108B, etc.) are dependent on the temperature of the pressure vessel 101. For example, at cryogenic temperatures (~20 K), the ultimate tensile strength (UTS) of aluminum is approximately 30% higher than the UTS of aluminum at room temperature (~300 K). Similarly, the young's modulus of aluminum is also greater at cryogenic temperatures. The strength and Young's modulus of most materials (e.g., most metals, most ceramics, etc.) also increase at lower temperatures. While examples described herein are described with reference to the pressure vessel 101, it should be appreciated that the teachings of this disclosure are not limited thereto. Instead, the examples described herein can be used in conjunction with any pressure vessel system containing any suitable substance.

In the illustrated example of FIG. 1, the pressure control system 100 includes an example first valve 124, an example second valve 126, an example third valve 128, an example first sensor 130, and an example second sensor 132. In the illustrated example of FIG. 1, the pressure control circuitry 102 controls the operation of the first valve 124, the second valve 126, and/or the third valve 128 and receives sensor data from the first sensor 130 and the second sensor 132.

The first valve 124 and the second valve 126 are automatic control valves (ACV) that control the flow through an example first line 134 and an example second line 136, respectively. The third valve 128 controls flow through an example third line 138. In the illustrated example of FIG. 1, the first valve 124, the second valve 126, and the third valve 128 vent GH2 into a surrounding environment of the pressure control system 100 (e.g., into the atmosphere, etc.). In some examples, the one or more of the lines 134, 136, 138 can vent GH2 to a hydrogen recapture system, which captures, reprocesses, and stores hydrogen vented from the pressure vessel 101. An example hydrogen recapture system that can be used in conjunction with the pressure control systems disclosed herein is described below in conjunction with FIG. 5.

In some examples, the valves 124, 126 are shut-off valves (e.g., on/off valves, etc.). In some such examples, the valves 124, 126 enable fine and robust control of the flow of gaseous hydrogen through the lines 134, 136, respectively, at low temperatures (e.g., controlling the position of some modulated valves can be inaccurate and/or imprecise at cryogenic temperatures, etc.). In some such examples, the pressure control circuitry 102 can set the position of the valves 124, 126 to an open position (e.g., a fully open position) and a closed position (e.g., a fully closed position, etc.). In some such examples, one or both of the valves 124, 126 can be implemented by a globe valve, a straight-through diaphragm valve, a gate valve, and/or another type of shut-off valve.

In other examples, one or both of the valves 124, 126 can be modulated valves. For example, one or both of the valves 124, 126 can be implemented by a butterfly valve, a ball valve, a weir-diaphragm valve, a needle valve, and/or another type of modulated valve. In some such examples, the second valve 126 can be absent and the first valve 124 can be a modulated control valve. For example, the first valve 124 can have multiple open positions (e.g., a first open position such as a partially open position, a second open position such as a fully open position, etc.), and a closed position (e.g., a fully closed position, etc.). In some such examples, the pressure control circuitry 102 can control the position of the first valve 124 to regulate the flow of gaseous hydrogen through the first line 134.

The third valve 128 is a pressure safety valve (PSV) that vents hydrogen from the pressure vessel 101 when a threshold pressure (e.g., the MAWP of the pressure vessel, 12 bar, 90% of the MAWP, etc.) is reached within the pressure vessel 101. In some examples, the threshold pressure of the third valve 128 can be the MAWP. In some examples, the third valve 128 can be implemented by a passive valve that is not controlled by the pressure control circuitry 102. For example, the third valve 128 can be implemented by a spring-loaded pressure relief valve, a balance bellows valve, and/or a balanced piston valve. In some such examples, the third valve 128 can include one or more mechanical elements (e.g., one or more springs, one or more pressurized pistons, etc.) that apply a force that retains the third valve 128 in a closed position. In some such examples, when the pressure within the pressure vessel 101 overcomes the force applied by the mechanical elements, the third valve 128 opens and releases pressure from within the pressure vessel 101 until the current pressure of the pressure vessel 101 falls beneath the threshold pressure. In other examples, the third valve 128 can be implemented by a control valve. In some such examples, the operation of the third valve 128 can be controlled by the pressure control circuitry 102.

The first sensor 130 measures and outputs the temperature of the pressure vessel 101 and/or the temperature of the hydrogen stored therein. For example, the first sensor 130 can output a signal indicative of the hydrogen stored in the pressure vessel being near cryogenic temperatures (e.g., ~20K, et.) and/or near ambient temperature (e.g., 290K, 300K, etc.). In some examples, the first sensor 130 can include one or more thermocouple(s), one or more resistance temperature detector(s), one or more thermistor(s), one or more infrared optical sensor(s), and/or one or more semiconductor-based sensor(s). In some examples, the first sensor 130 can be implemented by multiple temperature sensors distributed throughout the pressure vessel 101 (e.g., the inside of the pressure vessel 101, the outside of the pressure vessel 101, etc.) and/or in one or both of the lines 134, 136.

The second sensor 132 measures and outputs the pressure (e.g., 12 bar, 9.5 bar, 7.5 bar, etc.) of the hydrogen within the pressure vessel 101. In some examples, the second sensor 132 can be implemented via one or more piezoresistive sensor(s), one or more piezoelectric sensor(s), one or more strain gauge(s), one or more capacitive sensor(s), one or more electromagnetic sensor(s), one or more optical sensor (s), one or more thermal-based pressure sensor(s), one or more resonance-based pressure sensor(s), and/or a combination thereof. In some examples, the second sensor 132 can be implemented by pressure sensors distributed throughout the pressure vessel 101 (e.g., the inside of the pressure vessel 101, the outside of the pressure vessel 101, etc.) and/or in one or both of the lines 134, 136.

The MAWP of a pressure vessel is a static parameter that represents the maximum pressure a pressure vessel is intended to contain during operation. The MAWP of a pressure vessel is based on the geometry of the pressure vessel (e.g., the shape, size, and thickness of the pressure vessel, etc.), the material properties of the material(s) of the pressure vessel, and a safety factor (e.g., 2, etc.). Prior storage tanks are designed to operate under a single operating pressure under all conditions. As described above, because materials increase in strength at low temperatures, the actual strength of prior pressure vessels was typically near the MAWP during transient operations (e.g., when the tank is not at cryogenic temperatures, etc.). Prior pressure vessels typically operate substantially below (e.g., 50% below, 25% below, etc.) the actual strength of the pressure vessel during cryogenic operations (e.g., steady-state operation, etc.).

As used herein, the maximum operating pressure (MOP) of a pressure vessel refers to the maximum operating pressure of a pressure vessel (e.g., threshold pressure, etc.) permitted by the actual strength of the pressure vessel at the current temperature. Because the material strength of a pressure vessel is temperature dependent, the MOP of a pressure vessel is also temperature dependent. Unlike prior tanks and systems, in certain examples, the thickness(es) of the pressure vessel 101 (e.g., the thickness of the first composite overwrap 106A, the thickness of the second composite overwrap 106B, the thickness of the first metallic liner 108A, the thickness of the second metallic liner 108B, etc.) are designed based on the MOP during steady state cryogenic conditions instead of the MOP during hotter transient operations (e.g., when the MOP is approximately equal to the MAWP, etc.). That is, the pressure vessel 101 is designed to operate near the MOP of the pressure vessel 101 during steady-state cryogenic conditions. The pressure control circuitry 102 operates one or more of the valves 124, 126, 128 to selectively vent hydrogen and maintain the pressure vessel 101 within the MOP during transient operations (e.g., while the pressure vessel 101 is approaching cryogenic temperatures, etc.). Accordingly, the pressure control circuitry 102 and valves 124, 126, 128 enable the pressure vessel 101 to be substantially thinner and lighter than prior storage tanks. As such, the pressure vessel 101 offers improved functionality in applications that are weight and/or material sensitive (e.g., aviation applications, etc.). For example, a prior aluminum spherical pressure vessel configured to hold cryogenic hydrogen at 12 bar would have a wall thickness of 3.5 millimeters, and an equivalent pressure vessel implemented in accordance with the teachings of this disclosure could have a wall thickness of 2.2 millimeters and be 37% lighter than the prior tank.

The pressure control circuitry 102 controls the operation of one or more of the valves 124, 126, 128. For example, the pressure control circuitry 102 can cause the first valve 124 and/or the second valve 126 to actuate (e.g., move, etc.) from a closed position to an open position and/or from an open position to a closed position. In some examples, the pressure control circuitry 102 accesses sensor data from the sensors 130, 132. In some examples, the pressure control circuitry 102 can, based on temperature data received from the first sensor 130, determine the MOP of the pressure vessel 101 at the current temperature of the pressure vessel 101. In some such examples, the pressure control circuitry 102 can determine the MOP using a pre-loaded look-up table and/or a relationship curve. In some such examples, the pre-loaded look-up table and/or relationship curve can be generated via the properties of the pressure vessel. In other examples, the pressure control circuitry 102 can determine the MOP of the pressure vessel 101 via the properties of the pressure vessel 101 and analytics (e.g., via geometric principles, material properties, and/or mathematics, etc.).

In some examples, after determining the MOP of the pressure vessel 101 at the current temperature, the pressure control circuitry 102 can compare the current operating pressure of the pressure vessel 101 to the MOP. In some examples, if the current pressure exceeds the MOP, the pressure control circuitry 102 can open the first valve 124. Additionally or alternatively, the pressure control circuitry 102 can determine the rate of change of the pressure of the pressure vessel 101 and compare the determined rate of change to a first rate of change threshold. In some such examples, if the rate of change exceeds the rate of change threshold, the pressure control circuitry 102 can open the first valve 124. In some examples, after opening the first valve 124, the pressure control circuitry 102 can compare the rate of change of the pressure to a second rate of change threshold. In some examples, the second rate of change threshold can correspond to a minimum venting rate (e.g., a minimum allowed rate of pressure reduction within the pressure vessel 101, etc.). In some such examples, if the pressure control circuitry 102 determines the rate of change of the pressure does not satisfy the second rate of change threshold, the pressure control circuitry 102 can open the second valve 126. In other examples, if the second valve 126 is absent and the first valve 124 is a modulated valve, the pressure control circuitry 102 can cause the first valve 124 to actuate (e.g., move, etc.) to a second open position (e.g., a more open position than the first open position, a fully open position, etc.). In some examples, the pressure control circuitry 102 can be implemented at a control center associated with the pressure control system 100. In other examples, the pressure control circuitry 102 can be implemented locally at the pressure vessel 101.

Figure 2:
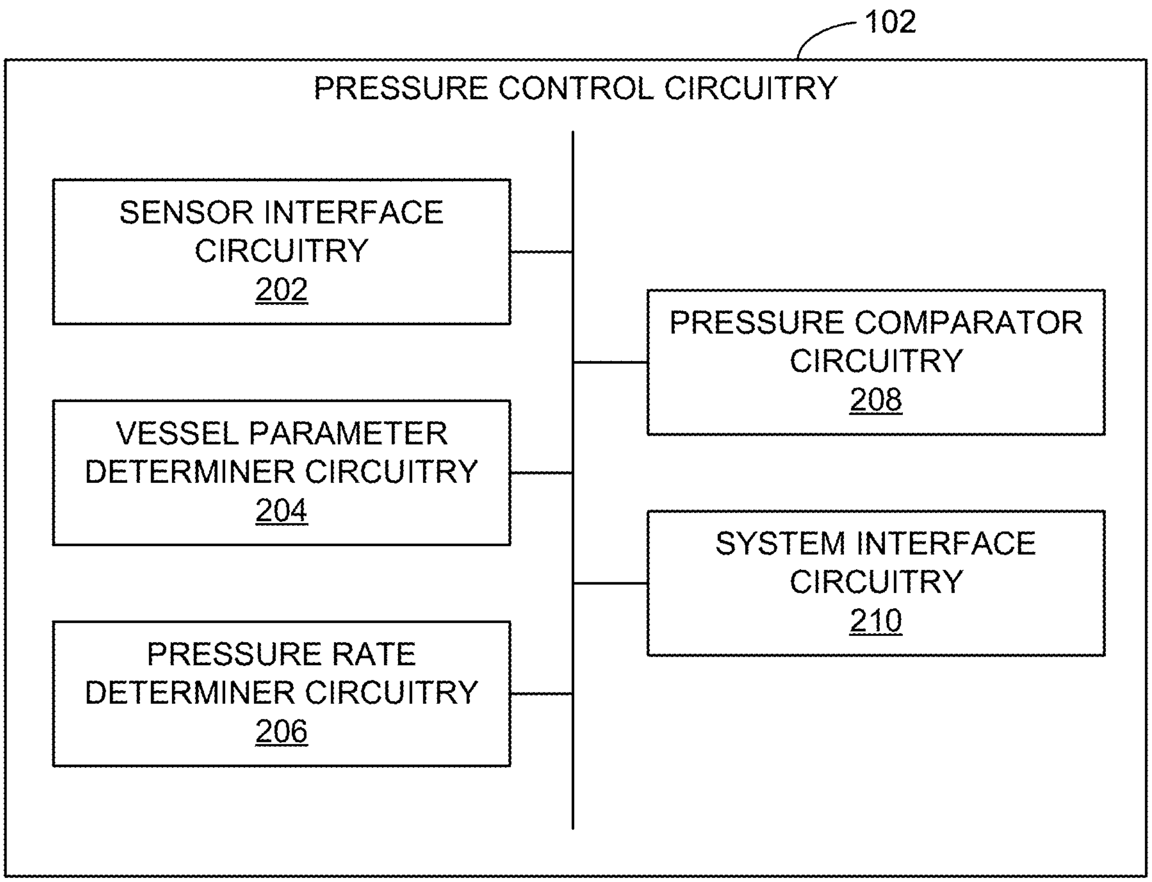
FIG. 2 is a block diagram of an example implementation of the pressure control circuitry of FIG. 1.

FIG. 2 is a block diagram of an example implementation of the pressure control circuitry 102 of FIG. 1 to regulate the pressure and vent rate of the pressure vessel 101 of FIG. 1. In the illustrated example of FIG. 2, the pressure control circuitry 102 includes example sensor interface circuitry 202, example vessel parameter determiner circuitry 204, example pressure rate determiner circuitry 206, example pressure comparator circuitry 208, and example system interface circuitry 210. The pressure control circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the pressure control circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The sensor interface circuitry 202 accesses sensor data relating to properties of the pressure vessel 101 and/or the substance stored therein. For example, the sensor interface circuitry 202 receives sensor data (e.g., sensor output, etc.) from the sensors 130, 132 of the pressure vessel 101, and/or the pressure control system 100. In some examples, the sensor interface circuitry 202 can transform the received sensor data from a machine-readable format (e.g., a voltage, a current, etc.) to a human-readable format (e.g., a string, a floating-point number, an integer, etc.). In some examples, the sensor interface circuitry 202 is instantiated by programmable circuitry executing sensor interface instructions and/or configured to perform operations such as those represented by the flowchart of FIG. 3.

In some examples, the pressure control circuitry 102 includes means for interfacing with sensors. For example, the means for sensor interfacing may be implemented by the sensor interface circuitry 202. In some examples, the sensor interface circuitry 202 may be instantiated by programmable circuitry such as the example programmable circuitry 612 of FIG. 6. For instance, the sensor interface circuitry 202 may be instantiated by the example microprocessor 700 of FIG. 7 executing machine executable instructions such as those implemented by at least block 304 of FIG. 3. In some examples, the sensor interface circuitry 202 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the sensor interface circuitry 202 may be instantiated by any other combination of hardware, software, and/or firmware. For example, the sensor interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The vessel parameter determiner circuitry 204 determines the MOP of the pressure vessel 101 based on the sensor data accessed by the sensor interface circuitry 202. For example, the vessel parameter determiner circuitry 204 can determine the MOP of the pressure vessel 101 via a look-up table and/or a relationship curve. In some such examples, the vessel parameter determiner circuitry 204 can access a look-up table and relationship curve that was pre-generated analytically by an operator of the pressure control system 100 that relates the MOP and the temperature of the pressure vessel 101 (e.g., a MOP of 11 bar at 20K, a MOP of 8.5 bar at 77K, a MOP of 7 at 200K, a MOP of 6.5 at 293K, etc.). For example, the MOP can be determined based on one or more properties of the pressure vessel 101 (e.g., the geometry of the pressure vessel 101 (e.g., the thicknesses of the layers of the pressure vessel 101, the shape of the pressure vessel 101, etc.), the material properties of the material of the pressure vessel 101 (e.g., the ultimate tensile strengths of the materials of the pressure vessel 101, the Young's moduli of the materials of the pressure vessel 101, etc.), etc.) and/or a safety factor (e.g., 1.5, 2, 3, etc.).

In some examples, the vessel parameter determiner circuitry 204 can determine a range of allowable rates of change of the pressure of the pressure vessel 101. For example, the vessel parameter determiner circuitry 204 can determine a maximum pressure gradient limit (MPL) (e.g., a maximum allowable rate of change of the pressure in the pressure vessel 101, an upper threshold rate of change, a first threshold rate of change, etc.) and a lower pressure gradient limit (LPL) (e.g., a minimum allowable rate of change of the pressure in the pressure vessel 101, a lower threshold rate of change, a second threshold rate of change, etc.). In some examples, the vessel parameter determiner circuitry 204 can determine the MPL and/or LPL based on the determined MOP (e.g., as a percentage of the MOP, as a percentage of the MAWP, etc.). In some examples, the vessel parameter determiner circuitry 204 can determine the MPL and/or LPL via a look-up table and/or a relationship curve based on the sensor data received by the sensor interface circuitry 202. Additionally or alternatively, the vessel parameter determiner circuitry 204 can determine the MPL and/or LPL based on a user command and/or by receiving the MPL and/or LPL from a memory associated with the vessel parameter determiner circuitry 204. In some examples, the vessel parameter determiner circuitry 204 is instantiated by programmable circuitry executing vessel parameter determiner instructions and/or configured to perform operations such as those represented by the flowchart of FIG. 3.

In some examples, the pressure control circuitry 102 includes means for determining the parameters of a pressure vessel. For example, the means for determining the parameters of a pressure vessel may be implemented by vessel parameter determiner circuitry 204. In some examples, the vessel parameter determiner circuitry 204 may be instantiated by programmable circuitry such as the example programmable circuitry 612 of FIG. 6. For instance, the vessel parameter determiner circuitry 204 may be instantiated by the example microprocessor 700 of FIG. 7 executing machine executable instructions such as those implemented by at least blocks 304, 306 of FIG. 3. In some examples, the vessel parameter determiner circuitry 204 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the vessel parameter determiner circuitry 204 may be instantiated by any other combination of hardware, software, and/or firmware. For example, the vessel parameter determiner circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The pressure rate determiner circuitry 206 determines the rate of change of the pressure of the pressure vessel 101. For example, the pressure rate determiner circuitry 206 can use the sensor data received by the sensor interface circuitry 202 to determine a rate of change of pressure. In some examples, the pressure rate determiner circuitry 206 can fit a curve (e.g., a linear curve, a polynomial curve, a logarithmic curve, etc.) to discrete pressure values accessed by the sensor interface circuitry 202. In other examples, the pressure rate determiner circuitry 206 can determine the rate of change of the pressure of the pressure vessel 101 via any other analytical method. In some examples, the pressure rate determiner circuitry 206 is instantiated by programmable circuitry executing pressure rate determiner instructions and/or configured to perform operations such as those represented by the flowchart of FIG. 3.

In some examples, the pressure control circuitry 102 includes means for determining the rate of change of the pressure. For example, the means for determining the rate of change of the pressure may be implemented by the pressure rate determiner circuitry 206. In some examples, the pressure rate determiner circuitry 206 may be instantiated by programmable circuitry such as the example programmable circuitry 612 of FIG. 6. For instance, the pressure rate determiner circuitry 206 may be instantiated by the example microprocessor 700 of FIG. 7 executing machine executable instructions such as those implemented by at least blocks 310, 316 of FIG. 3. In some examples, the pressure rate determiner circuitry 206 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the pressure rate determiner circuitry 206 may be instantiated by any other combination of hardware, software, and/or firmware. For example, the pressure rate determiner circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The pressure comparator circuitry 208 compares the current pressure and/or rate of change of the pressure of the pressure vessel 101 to the parameters determined by the vessel parameter determiner circuitry 204 and/or the pressure rate determiner circuitry 206. For example, the pressure comparator circuitry 208 can determine if the pressure of the pressure vessel 101 exceeds the MOP of the storage tank at the current temperature. In some examples, the pressure comparator circuitry 208 can determine if the rate of change of the pressure is increasing above the MPL of the tank and/or is not decreasing faster than the LPL. In some examples, the pressure comparator circuitry 208 is instantiated by programmable circuitry executing pressure comparator instructions and/or configured to perform operations such as those represented by the flowchart of FIG. 3.

In some examples, the pressure control circuitry 102 includes means for comparing pressures. For example, the means for comparing pressures may be implemented by the pressure comparator circuitry 208. In some examples, the pressure comparator circuitry 208 may be instantiated by programmable circuitry such as the example programmable circuitry 612 of FIG. 6. For instance, the pressure comparator circuitry 208 may be instantiated by the example microprocessor 700 of FIG. 7 executing machine executable instructions such as those implemented by at least blocks 308, 312, 318, 322 of FIG. 3. In some examples, the pressure comparator circuitry 208 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the pressure comparator circuitry 208 may be instantiated by any other combination of hardware, software, and/or firmware. For example, the pressure comparator circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The system interface circuitry 210 interfaces with the first valve 124, the second valve 126, and/or the third valve 128 of the pressure control system 100. For example, the system interface circuitry 210 can send commands to one or more of the valves 124, 126, 128 to change positions (e.g., to move/actuate from a closed position to an open position, to move/actuate from an open position to a closed position, etc.). In some examples, the system interface circuitry 210 can communicate with one or more of the valves 124, 126, 128 via electric signals (e.g., a wired connection, a wireless connection, etc.), pneumatic signals, and/or hydraulic signals. In some examples, the system interface circuitry 210 can determine if the pressure control system 100 is undergoing transient operations.

For example, the system interface circuitry 210 can determine the pressure control system 100 is undergoing transient operations based on detecting a user command (e.g., a command to fill the pressure vessel 101, a command to empty the pressure vessel 101, a command to change the temperature of the pressure vessel 101, etc.). Additionally or alternatively, the system interface circuitry 210 can detect transient operations based on a change in sensor output, based on a scheduled transient operation, etc. For example, the system interface circuitry 210 can detect, via sensor data, a change in temperature (e.g., an increase in temperature above a cryogenic temperature, etc.). In some examples, the system interface circuitry 210 is instantiated by programmable circuitry executing system interface instructions and/or configured to perform operations such as those represented by the flowchart of FIG. 3.

In some examples, the pressure control circuitry 102 includes means for interfacing with a system. For example, the means for interfacing with a system may be implemented by the system interface circuitry 210. In some examples, the system interface circuitry 210 may be instantiated by programmable circuitry such as the example programmable circuitry 612 of FIG. 6. For instance, the system interface circuitry 210 may be instantiated by the example microprocessor 700 of FIG. 7 executing machine executable instructions such as those implemented by at least blocks 314, 320, 324, 326 of FIG. 3. In some examples, the system interface circuitry 210 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the system interface circuitry 210 may be instantiated by any other combination of hardware, software, and/or firmware. For example, the system interface circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the pressure control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the sensor interface circuitry 202, the vessel parameter determiner circuitry 204, the pressure rate determiner circuitry 206, the pressure comparator circuitry 208, the system interface circuitry 210, and/or, more generally, the example pressure control circuitry 102 of FIG. 2, may be implemented by hardware alone or by hardware in combination with software and/or firmware. Thus, for example, any of the sensor interface circuitry 202, the vessel parameter determiner circuitry 204, the pressure rate determiner circuitry 206, the pressure comparator circuitry 208, the system interface circuitry 210, and/or, more generally, the example pressure control circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example pressure control circuitry 102 of FIG. 2 may include one or more elements, processes, and/or devices in addition to, or instead of, those illustrated in FIG. 2, and/or may include more than one of any or all of the illustrated elements, processes and devices.

Figure 3:
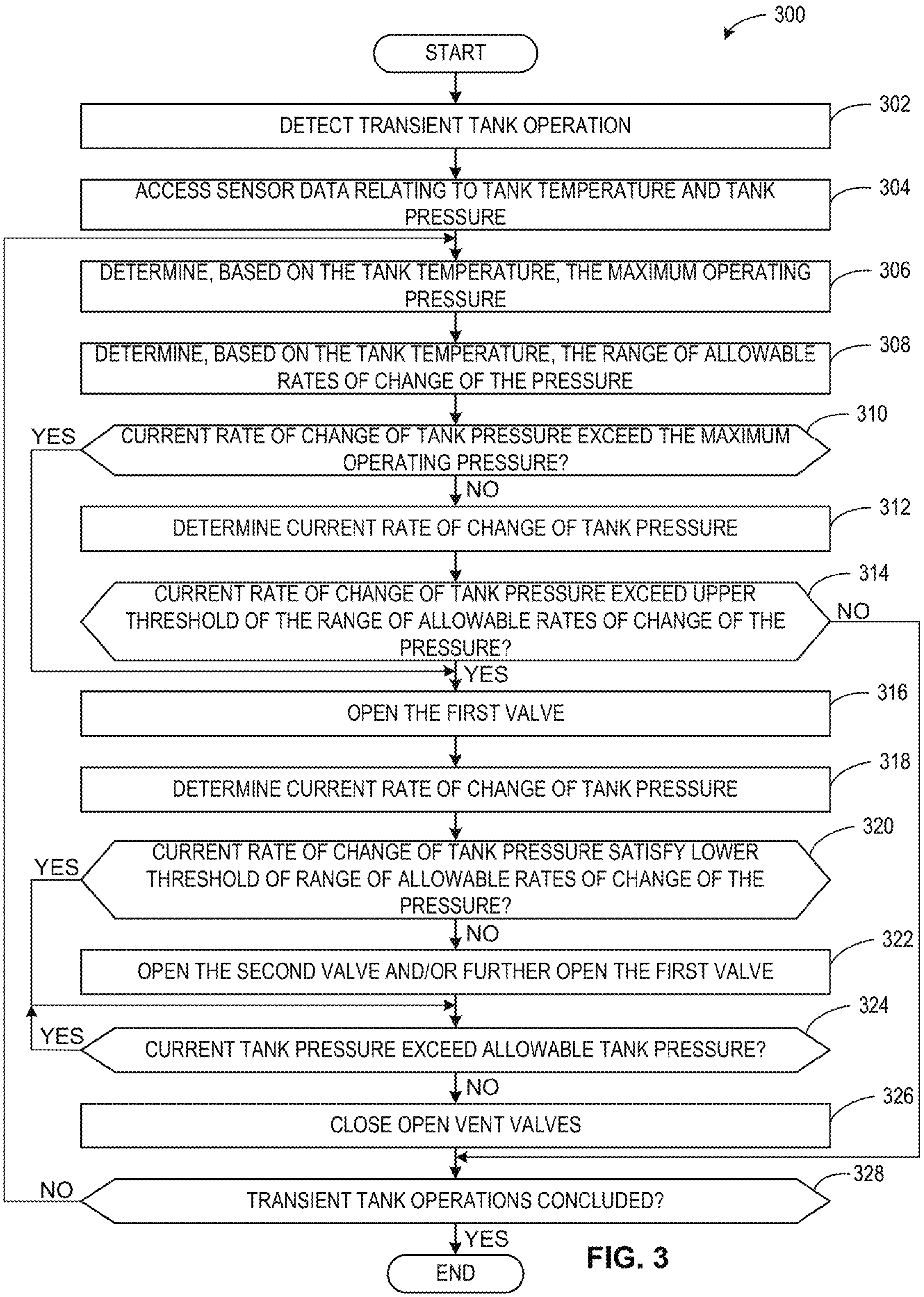
FIG. 3 is a flowchart representative of example machine readable instructions and/or example operations that may be executed, instantiated, and/or performed by example programmable circuitry to implement the pressure control circuitry 102 of FIG. 2.

A flowchart representative of example machine readable instructions, which may be executed by programmable circuitry to implement and/or instantiate the pressure control circuitry 102 of FIG. 2 and/or representative of example operations which may be performed by programmable circuitry to implement and/or instantiate the pressure control circuitry 102 of FIG. 2, are shown in FIG. 3. The machine readable instructions may be one or more executable programs or portion(s) of one or more executable programs (also referred to herein as machine executable instructions) for execution by programmable circuitry such as the programmable circuitry 612 shown in the example programmable circuitry platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 3, many other methods of implementing the example pressure control circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 3 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 3 is a flowchart representative of example machine readable instructions and/or example operations 300 that may be executed, instantiated, and/or performed by programmable circuitry, such as pressure control circuitry 102 of FIG. 2, to regulate the pressure and vent rate of the pressure vessel 101 of FIG. 1. The example machine-readable instructions and/or the example operations 300 of FIG. 3 begin at block 302, at which the system interface circuitry 210 detects the pressure vessel 101 is undergoing transient tank operations. For example, the system interface circuitry 210 determines the pressure vessel 101 is undergoing transient operations. For example, the system interface circuitry 210 can determine if the pressure vessel 101 is experiencing warm-up operations, cool-down operations, fill operations (e.g., is receiving H2 via the LH2 fill pipe 114, etc.), and/or extraction operations (e.g., is having H2 extracted via the GH2 extraction pipe 116 and/or the LH2 extraction pipe 118, etc.). In some examples, the system interface circuitry 210 can detect via sensor information received by the sensor interface circuitry 202 (e.g., if the temperature of the pressure vessel 101 is above cryogenic temperatures, etc.). Additionally or alternatively, the system interface circuitry 210 can determine that the pressure vessel 101 is undergoing a transient operation by detecting a user command (e.g., an operator of the pressure control system 100, etc.) to operate the pressure control system 100.

At block 304, the sensor interface circuitry 202 accesses sensor data relating to tank temperature and tank pressure. For example, the sensor interface circuitry 202 receives sensor data (e.g., sensor output, etc.) from the sensors 130, 132 of the pressure vessel 101, and/or the pressure control system 100. In some examples, the sensor interface circuitry 202 can transform the received sensor data from a machine-readable format (e.g., a voltage, a current, etc.) to a human-readable format (e.g., a string, a floating-point number, an integer, etc.).

At block 306, the vessel parameter determiner circuitry 204 determines, based on the tank temperature, a MOP of the pressure vessel 101. For example, the vessel parameter determiner circuitry 204 can determine the MOP of the pressure vessel 101 via a look-up table and/or relationship curve stored in a memory associated with the vessel parameter determiner circuitry 204 (e.g., the local memory 613 of FIG. 6, the volatile memory 614 of FIG. 6, the non-volatile memory 616 of FIG. 6, the mass storage device 628 of FIG. 6, etc.) and/or instantiated in programmable circuitry associated with the vessel parameter determiner circuitry 204. In some such examples, the values of the look-up table and/or relationship curve can be determined analytically via one or more properties of the pressure vessel (e.g., the geometry of the pressure vessel 101 (e.g., the thicknesses of the layers of the pressure vessel 101, the shape of the pressure vessel 101, etc.), the material properties of the material of the pressure vessel 101 as a function of temperature (e.g., the ultimate tensile strengths of the materials of the pressure vessel 101, the Young's moduli of the materials of the pressure vessel 101, etc.), etc.) and/or a safety factor (e.g., 1.5, 2, 3, etc.), and a safety factor. In some examples, the vessel parameter determiner circuitry 204 can determine the MOP analytically via the geometry of the pressure vessel 101, the material properties of the material of the pressure vessel 101, and/or a safety factor.

At block 308, the vessel parameter determiner circuitry 204 determines, based on the tank temperature, the range of allowable rates of change of the pressure. For example, the vessel parameter determiner circuitry 204 can determine a maximum pressure gradient limit (MPL) (e.g., a maximum allowable rate of change of the pressure in the pressure vessel 101, an upper threshold of the range, etc.) and a minimum pressure gradient limit (LPL) (e.g., a minimum allowable rate of change of the pressure in the pressure vessel 101, a lower threshold of the range, etc.). In some examples, the vessel parameter determiner circuitry 204 can determine the MPL and/or LPL based on the determined MOP during block 306 (e.g., as a percentage of the MOP, as a percentage of the MAWP, etc.). In some examples, the vessel parameter determiner circuitry 204 can determine the MPL and/or LPL via a look-up table and/or relationship curve based on the sensor data received by the sensor interface circuitry 202 during the execution of block 302. Additionally or alternatively, the vessel parameter determiner circuitry 204 can determine the MPL and/or LPL based on a user command and/or by receiving the MPL and/or LPL from a memory associated with the vessel parameter determiner circuitry 204 (e.g., the local memory 613 of FIG. 6, the volatile memory 614 of FIG. 6, the non-volatile memory 616 of FIG. 6, the mass storage device 628 of FIG. 6, etc.).

At block 310, the pressure comparator circuitry 208 determines whether the current tank pressure exceeds the allowable tank pressure. For example, the pressure comparator circuitry 208 can compare the current tank pressure to the allowable tank pressure to determine whether the current tank pressure is greater than the allowable tank pressure determined during the execution of block 306. If the pressure comparator circuitry 208 determines that the current pressure exceeds the allowable tank pressure, then the operations 300 advance to block 316. If the pressure comparator circuitry 208 determines that the current pressure does not exceed the allowable tank pressure, then the operations 300 advance to block 312.

At block 312, the pressure rate determiner circuitry 206 determines the current rate of change of the tank pressure. For example, the pressure rate determiner circuitry 206 can use the sensor data received by the sensor interface circuitry 202 to determine a rate of change of pressure. In some examples, the pressure rate determiner circuitry 206 can fit a curve (e.g., a linear curve, a polynomial curve, a logarithmic curve, etc.) to discrete pressure values accessed by the sensor interface circuitry 202. In other examples, the pressure rate determiner circuitry 206 can determine the rate of change of the pressure of the pressure vessel 101 via any other analytical method.

At block 314, the pressure comparator circuitry 208 determines whether the current rate of change of tank pressure exceeds the upper threshold of the range of allowable rates of change of the pressure. For example, the pressure comparator circuitry 208 can compare the current rate of change of tank pressure to the range of allowable tank pressure rates of change to determine whether the current rate of change of tank pressure is greater than the upper or maximum threshold rate of change of the range of rates of change determined during the execution of block 308. If the pressure comparator circuitry 208 determines the current rate of change of pressure exceeds the range of allowable rates of change of pressure, then the operations 300 advance to block 316. If the pressure comparator circuitry 208 determines the current rate of change of pressure does not exceed the range of allowable rates of change of pressure, then the operations 300 advance to block 328.

At block 316, the system interface circuitry 210 opens the first valve 124. For example, the system interface circuitry 210 can send a command (e.g., a pneumatic command, an electric command, a hydraulic command, etc.) to operate the first valve 124. Additionally or alternatively, the system interface circuitry 210 can generate an alert from an operator of the pressure control system 100 to open the first valve 124 (e.g., to manually operating the first valve 124, to generate a command to operate the first valve 124, etc.). In some examples, the system interface circuitry 210 can send a command to move the first valve 124 from a closed position to an open position (e.g., a fully open position, etc.). In some examples, if the first valve 124 is a modulated valve, then the system interface circuitry 210 can send a command to move the first valve 124 from a closed position to a partially open position (e.g., a first open position, etc.).

At block 318, the pressure rate determiner circuitry 206 determines the rate of change of the tank pressure. For example, the pressure rate determiner circuitry 206 can use the sensor data received by the sensor interface circuitry 202 to determine a rate of change of pressure. In some examples, the pressure rate determiner circuitry 206 can fit a curve (e.g., a linear curve, a polynomial curve, a logarithmic curve, etc.) to discrete pressure values accessed by the sensor interface circuitry 202. In other examples, the pressure rate determiner circuitry 206 can determine the rate of change of the pressure of the pressure vessel 101 via any other analytical method.

At block 320, the pressure comparator circuitry 208 determines whether the current rate of change of tank pressure satisfies the lower threshold of the range of allowable rates of change of the pressure. For example, the pressure comparator circuitry 208 can determine if the current rate of change of tank pressure is less than the minimum threshold rate of change (e.g., a minimum rate of reduction, etc.) of the range of rates of change determined during the execution of block 308. If the pressure comparator circuitry 208 determines the current rate of change of pressure satisfies the range of allowable rates of change of pressure, then the operations 300 advance to block 324. If the pressure comparator circuitry 208 determines the current rate of change of pressure does not satisfy the range of allowable rates of change of pressure, then the operations 300 advance to block 322.

At block 322, the system interface circuitry 210 opens the second valve 126 and/or further opens the first valve 124. For example, the system interface circuitry 210 can send a command (e.g., a pneumatic command, an electric command, a hydraulic command, etc.) to operate the first valve 124 and/or the second valve 126. Additionally or alternatively, the system interface circuitry 210 can generate an alert from an operator of the pressure control system 100 to open the first valve 124 and/or the second valve 126 (e.g., to manually operate one or both of the valves 124, 126, to generate a command to operate one or both of the valves 124, 126, etc.). In some examples, the system interface circuitry 210 can send a command to move the second valve 126 from a closed position to an open position (e.g., a fully open position, etc.). Additionally or alternatively, if the first valve 124 is a modulated valve, the system interface circuitry 210 can send a command to move the first valve 124 from a first open position (e.g., the position set during the execution of block 316, etc.) to a second open position (e.g., a fully open position, another partially open position that is more open than the first open position, etc.).

At block 324, the pressure comparator circuitry 208 determines whether the current tank pressure exceeds the allowable tank pressure. For example, the pressure comparator circuitry 208 can compare the current tank pressure to the allowable tank pressure to determine whether the current tank pressure is greater than the allowable tank pressure determined during the execution of block 306. In some examples, the pressure comparator circuitry 208 can determine whether the opening of one or both of the first valve 124 and/or the second valve 126 has reduced the pressure below the allowable tank pressure. If the pressure comparator circuitry 208 determines the current pressure exceeds the allowable tank pressure, then the operations 300 repeat the execution of block 324 to allow more time for pressure to be dissipated via the opening of one or both of the first valve 124 and/or the second valve 126. If the pressure comparator circuitry 208 determines the current pressure does not exceed the allowable tank pressure, then the operations 300 advance to block 326.

At block 326, the system interface circuitry 210 closes the open valves. For example, the system interface circuitry 210 can send a command (e.g., a pneumatic command, an electric command, a hydraulic command, etc.) to articulate the first valve 124 and/or the second valve 126 (e.g., if the second valve 126 is open, etc.) to a closed position (e.g., a fully closed position, etc.). Additionally or alternatively, the system interface circuitry 210 can generate an alert from an operator of the pressure control system 100 to close the first valve 124 and/or the second valve 126 (e.g., to manually operate one or both of the valves 124, 126, to generate a command to operate one or both of the valves 124, 126, etc.).

At block 328, the system interface circuitry 210 determines whether the transient operations of the pressure vessel 101 have ended. For example, the system interface circuitry 210 can determine if the pressure vessel 101 has reached a steady-state condition via sensor information received by the sensor interface circuitry 202 (e.g., if the temperature of the pressure vessel 101 has reached cryogenic temperatures, etc.). Additionally or alternatively, the system interface circuitry 210 can detect that hydrogen is no longer being added to and/or removed from the pressure vessel 101 (e.g., via the LH2 fill pipe 114, via the GH2 extraction pipe 116, via the LH2 extraction pipe 118, etc.). Additionally or alternatively, the system interface circuitry 210 can determine if the transient operations of the pressure vessel 101 have ended by another means (e.g., via a user command, via a timer, etc.). If the system interface circuitry 210 has determined transient operation of the pressure vessel 101 has ended, the operations 300 end. If the system interface circuitry 210 has determined transient operation of the pressure vessel 101 has not ended, the operations 300 return to block 306.

Figure 4:
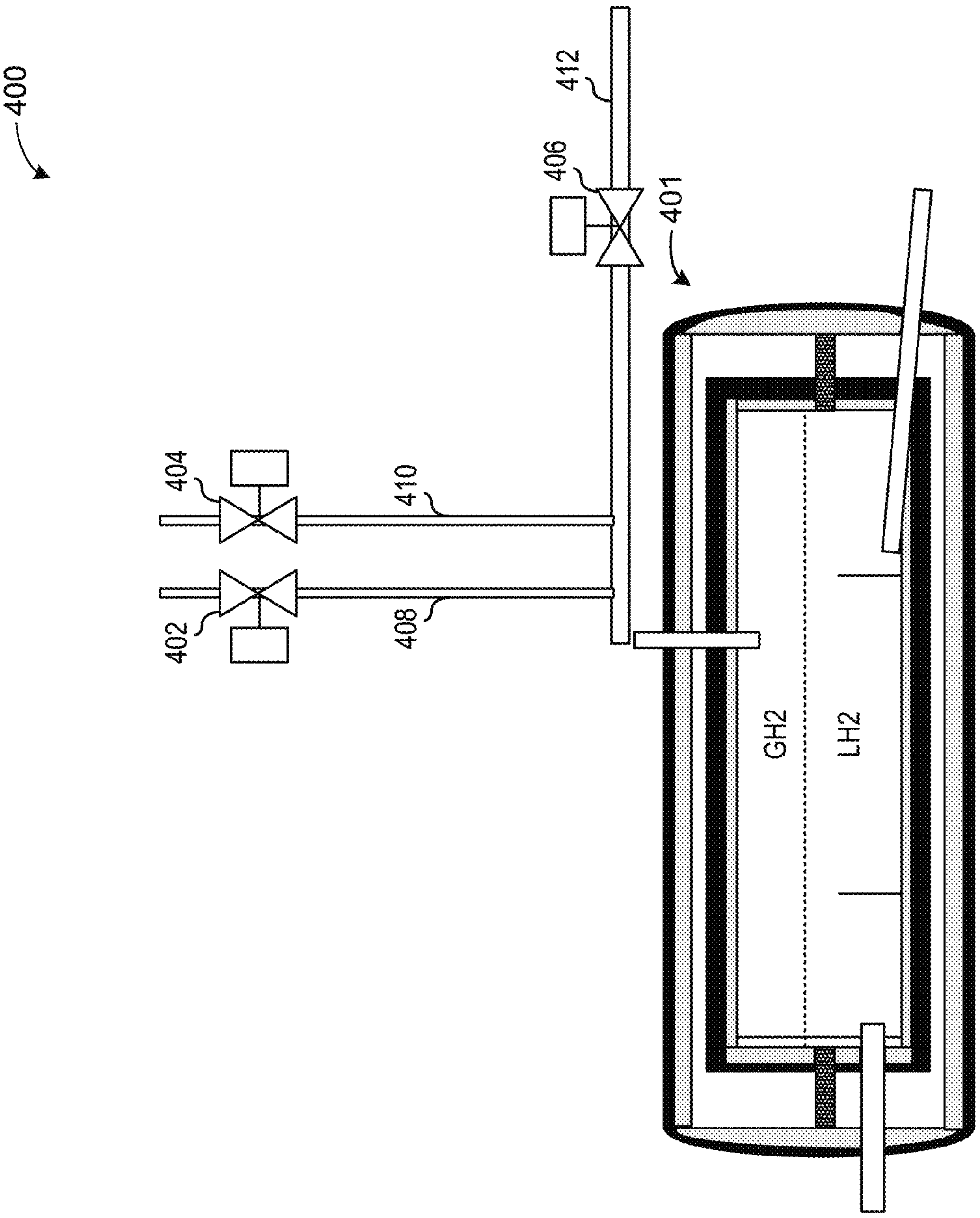
FIG. 4 is a schematic diagram of an example environment including another system implemented in accordance with the teachings of this disclosure.

FIG. 4 illustrates another example pressure control system 400 implemented in accordance with the teachings of this disclosure. In the illustrated example of FIG. 4, the pressure control system 400 includes an example pressure vessel 401. The pressure vessel 401 is similar to the pressure vessel 101 of FIG. 1, except that the pressure vessel 401 is fluidly coupled to an example first valve 402, an example second valve 404, and an example third valve 406. The valves 402, 404, 406 control the flow of hydrogen from the pressure vessel 401 through an example first line 408, an example second line 410, and an example third line 412, respectively. Unlike the pressure control system 100 of FIG. 1, the pressure control system 400 is a passive control system that does not include controller circuitry and/or control logic to control the operation of the valves 402, 404, 406. In some examples, some or all of the valves 402, 404, 406 can include localized control circuitry that is preprogrammed to articulate when one or more preset condition(s) are detected (e.g., threshold temperature(s), threshold pressure(s), etc.). Additionally or alternatively, the valves 402, 404, 406 can include mechanical control systems (e.g., a spring, a diaphragm, etc.).

In the illustrated example of FIG. 4, the valves 402, 404, 406 are shutoff automatic control valves that vent hydrogen from the pressure vessel 401 if the corresponding threshold (s) are reached within the pressure vessel 401. In some examples, some or all of the valves 402, 404, 406 can be temperature safety valves (TSVs) that automatically open (e.g., without a command from external control circuitry, etc.) when one or more target temperatures are exceeded. For example, the first valve 402 can have a first threshold temperature (e.g., room temperature (~290K), 273K, 250K, 100K, etc.), the second valve 404 can have a second threshold temperature (e.g., 100K, 50K, 25K, 20K, etc.) that is less than the first threshold temperature and greater than and/or equal to the steady-state operating temperature of the pressure vessel 401. It should be appreciated that the temperature threshold(s) associated with the valves 402, 404, 406 correspond to particular temperature-based MOPs of the pressure vessel 401. In some examples, the third valve 406 is a pressure safety valve (e.g., has a pressure-based threshold, etc.) and the first valve 402 and the second valve 404 are temperature safety valves (e.g., have temperature-based threshold(s), etc.). In some such examples, the MAWP of the pressure vessel 401 can be the pressure threshold associated with the third valve 406.

Additionally or alternatively, some or all of the first valve 402, the second valve 404, and/or the third valve 406 can be pressure safety valves with corresponding threshold pressures. For example, the first valve 402 can have a first threshold pressure, the second valve 404 can have a second threshold pressure different than the first threshold pressure, and the third threshold pressure is different than the first threshold pressure and the second threshold pressure.

Unlike prior tanks and systems and like the pressure vessel 101 of FIG. 1, the thickness of the pressure vessel 401 is designed based on the MOP (e.g., the actual strength of the pressure vessel 401 at cryogenic temperatures, etc.) during steady state conditions instead of the MOP during transient operations. During transient operation, the pressure vessel 401 operates at above cryogenic temperature, which reduces the MOP of the pressure vessel 401. The example valves 402, 404, 406 are configured to maintain the pressure of the pressure vessel 401 under the MOP during transient operation. For example, if the pressure vessel 401 is being brought to cryogenic temperatures from room temperature, the valves 402, 404 are opened due to the temperature of the pressure vessel 401, which causes some of the hydrogen to exit the pressure vessel 401 via the lines 408, 410, which maintains the pressure of the pressure vessel 401 beneath of the MOP associated with the threshold temperature of the first valve 402. As the temperature of the pressure vessel 401 decreases and the MOP of the pressure vessel 401 increases, the first valve 402 closes, which reduces the vent rate of hydrogen from the pressure vessel 401 and maintains the pressure of the pressure vessel 401 beneath the MOP associated with the threshold temperature of the second valve 404. As the temperature of the pressure vessel 401 further decreases and the MOP of the pressure vessel 401 further increases, the second valve 404 closes, which further reduces the vent rate of hydrogen from the pressure vessel 401 and maintains the pressure of the pressure vessel 401 beneath the threshold pressure of the third valve 406 (e.g., the MAWP of the pressure vessel 401, etc.). Accordingly, the valves 402, 404, 406 enable the pressure vessel 401 to be substantially thinner and lighter than prior storage tanks (e.g., 30% lighter, 40% lighter, 50% lighter, etc.). As such, the pressure vessel 401 offers improved functionality in applications that are weight and/or material sensitive (e.g., aviation applications, etc.).

While the pressure control system 400 of FIG. 4 is depicted as including three valves (e.g., the valves 402, 404, 406, etc.), it should be appreciated that other systems implemented in accordance with the teachings of this disclosure can include a different number of valves (e.g., two valves, four valves, ten valves, etc.). In some such examples, increasing the number of valves in a passive system like the pressure control system 400 of FIG. 4 enables more precise venting of hydrogen based on temperature, which reduces the hydrogen loss of the pressure control system 400 and/or reduces the required thickness of the pressure vessel 401.

Figure 5:
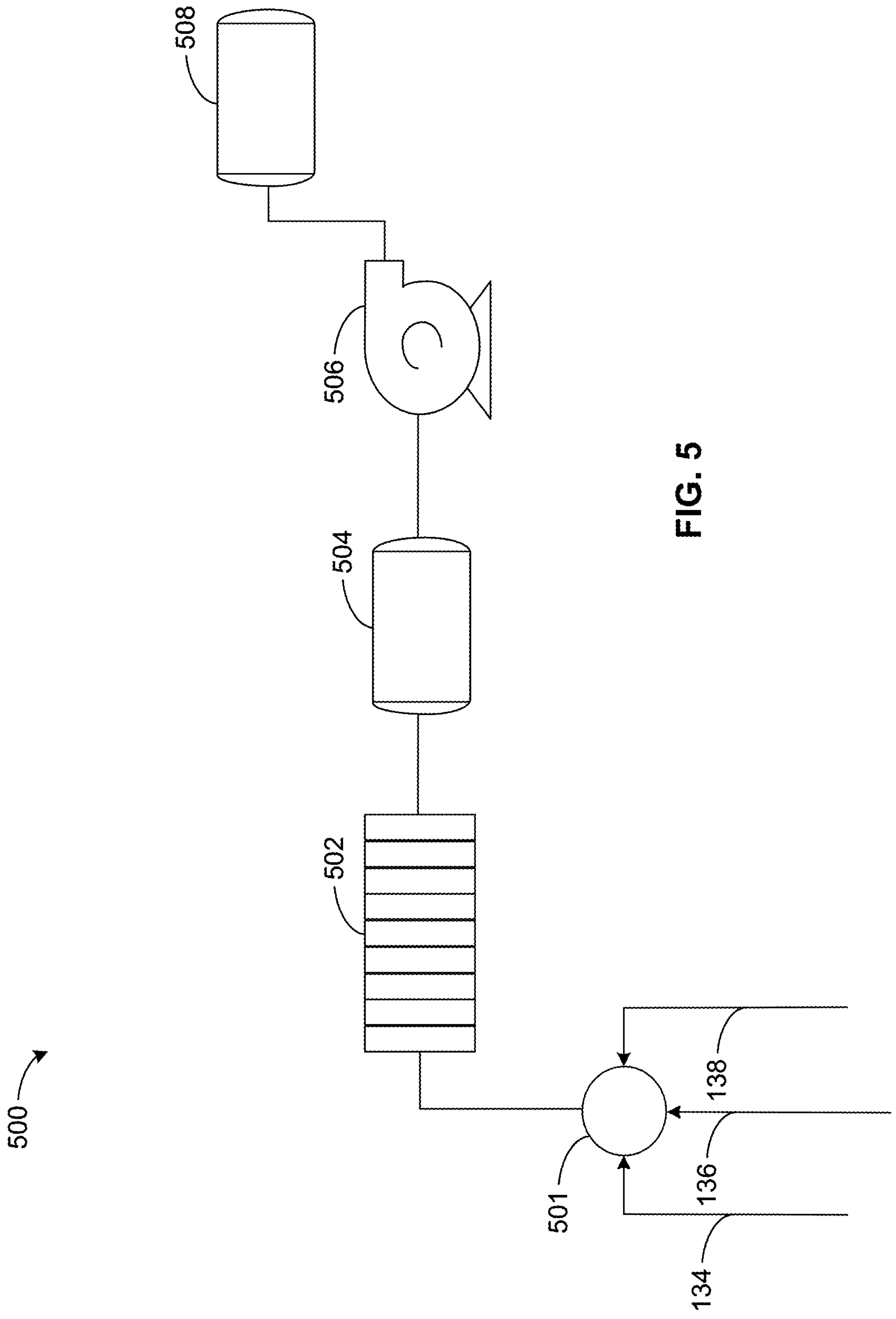
FIG. 5 is a schematic diagram of an example recapture system that can be used in conjunction with the systems of FIGS. 1 and/or 4.

FIG. 5 is a schematic diagram of an example hydrogen recapture system 500 that can be used in conjunction with the pressure control system 100 of FIG. 1 and/or the pressure control system 400 of FIG. 4. In the illustrated example of FIG. 5, the hydrogen recapture system 500 includes an example junction 501, an example heat exchanger 502, an example H2 buffer tank 504, an example compressor 506, and an example gaseous storage tank 508.

In the illustrated example, the example lines 134, 136, 138 of FIG. 1 are coupled to the junction 501, which flows into the heat exchanger 502. That is, the junction 501 receives vented hydrogen from the first valve 124, the second valve 126, and the third valve 128, respectively.

The heat exchanger 502 heats the hydrogen vented via the lines 134, 136, 138. For example, the heat exchanger 502 can heat the hydrogen to a temperature compatible with the compressor 506. The H2 buffer tank 504 stores the heated hydrogen gas received from the heat exchanger 502. In some such examples, when a suitable volume and/or threshold pressure is reached in the H2 buffer tank 504, the compressor 506 activates and draws hydrogen from the H2 buffer tank 504. The compressor 506 pressurizes the gas leaving the H2 buffer tank 504 and directs the pressurized gas into the gaseous storage tank 508. The pressurized gas in the gaseous storage tank 508 can be converted back into a cryogenic fluid and used at a later time as a cryogenic fuel by the pressure control system 100 of FIG. 1 and/or the pressure control system 400 of FIG. 4.

In some examples, the use of the hydrogen recapture system 500 can reduce the loss rate of the hydrogen of the pressure control systems 100, 400, which can have greater loss rates than prior systems due to the expected operation of the valves during transient operations of the pressure control systems 100, 400. While FIG. 5 illustrates a system for recapturing hydrogen, it should be appreciated recapture systems implemented in accordance with the teachings of this disclosures can be used in conjunction with pressure vessels storing other cryogenic gases (e.g., air, nitrogen, helium, neon, oxygen, fluorine, argon, methane, etc.).

Figure 6:
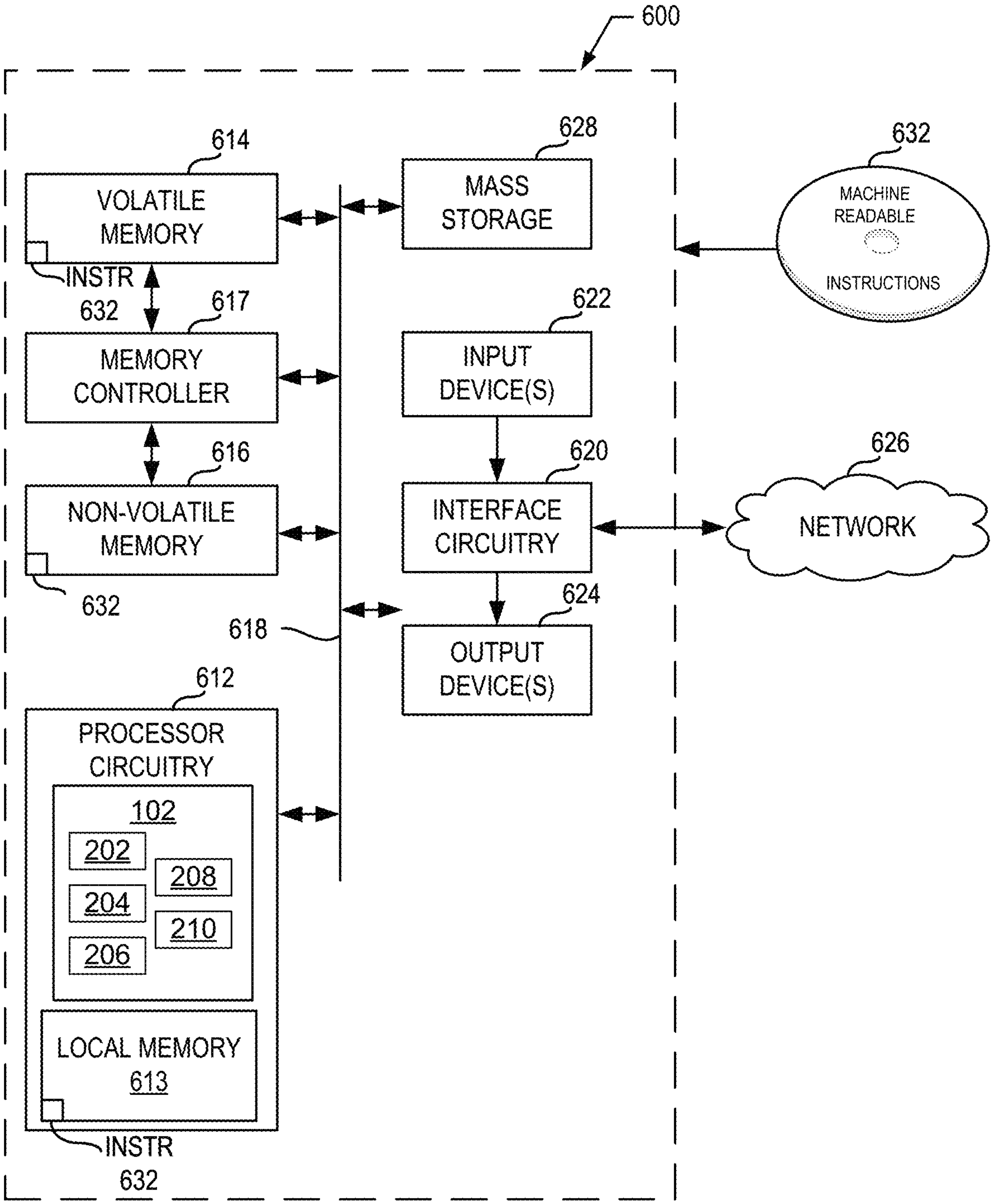
FIG. 6 is a block diagram of an example processing platform including programmable circuitry structured to execute, instantiate, and/or perform the example machine readable instructions and/or perform the example operations of FIG. 3 to implement the pressure control circuitry 102 of FIG. 2.

FIG. 6 is a block diagram of an example programmable circuitry platform 600 structured to execute and/or instantiate the example machine-readable instructions and/or the example operations of FIG. 3 to implement the pressure control circuitry 102 of FIG. 2. The programmable circuitry platform 600 can be, for example, a server, a personal computer, a workstation, a self-learning machine (e.g., a neural network), a mobile device (e.g., a cell phone, a smart phone, a tablet such as an iPad™), an Internet appliance, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the sensor interface circuitry 202, the vessel parameter determiner circuitry 204, the pressure rate determiner circuitry 206, the pressure comparator circuitry 208, and the system interface circuitry 210.

The programmable circuitry 612 of the illustrated example includes a local memory 613 (e.g., a cache, registers, etc.). The programmable circuitry 612 of the illustrated example is in communication with a volatile memory 614 and a non-volatile memory 616, collectively referred to herein as main memory, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 632, may be implemented by the machine readable instructions of FIG. 3 and stored in the mass storage device 628, in the volatile memory 614, in the non-volatile memory 616, and/or on at least one non-transitory computer readable storage medium such as a CD or DVD which may be removable.

Figure 7:
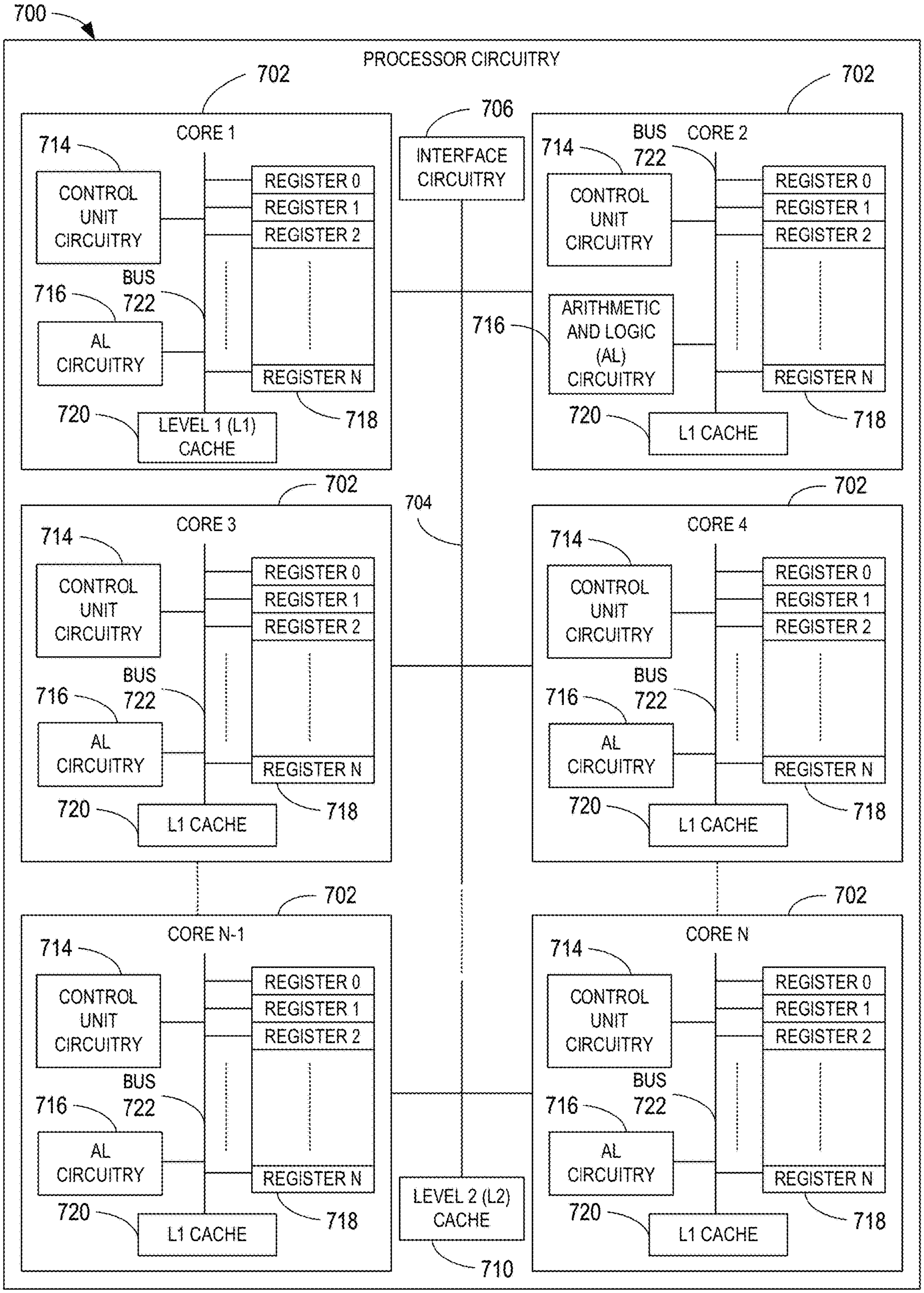
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowchart of FIG. 3 to effectively instantiate the circuitry of FIG. 2 as logic circuits to perform operations corresponding to those machine readable instructions. In some such examples, the circuitry of FIG. 2 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 3.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
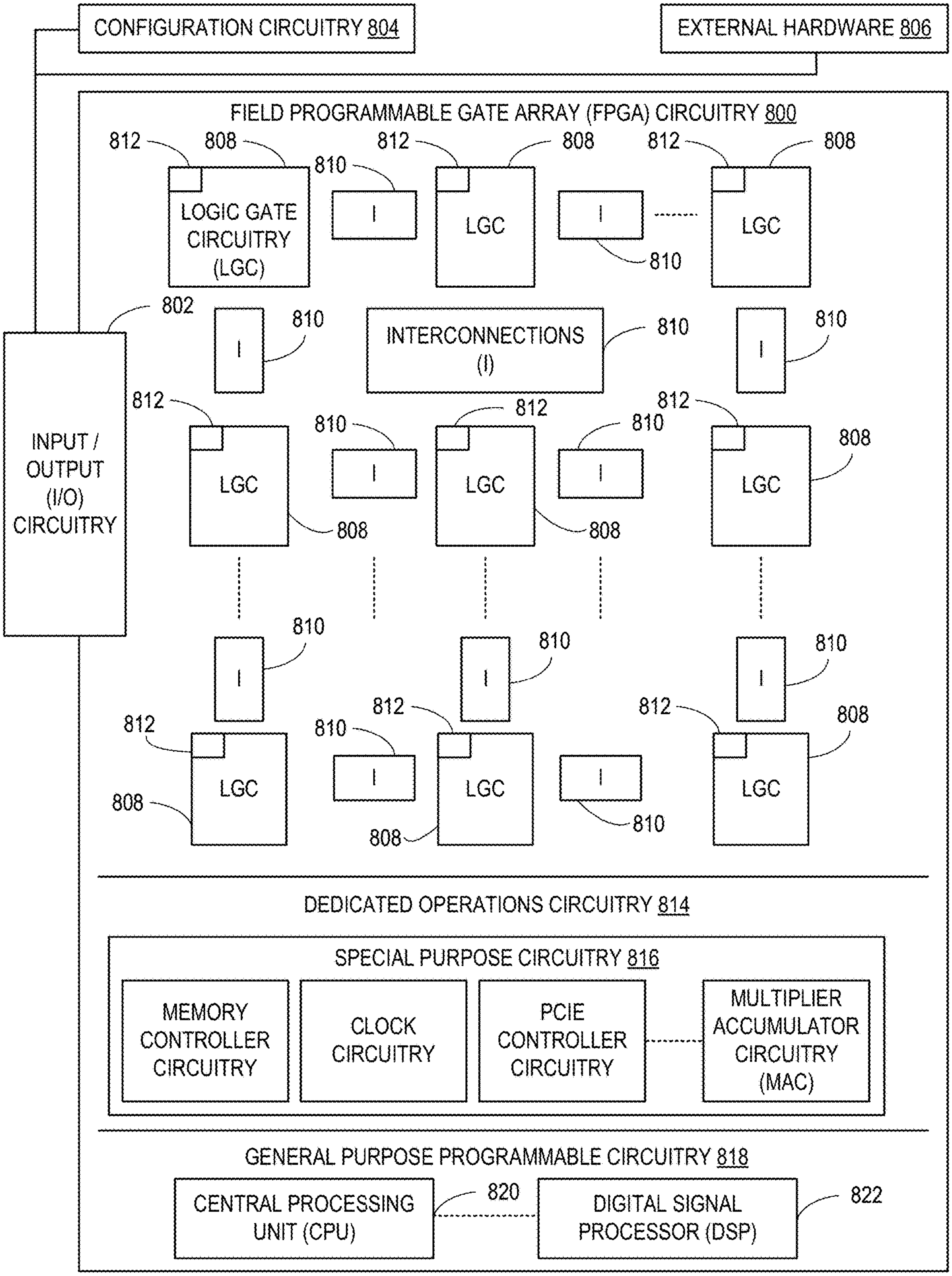
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart(s) of FIG. 3 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart(s) of FIG. 3. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIG. 3. As such, the FPGA circuitry 800 may be configured and/or structured to effectively instantiate some or all of the operations/functions corresponding to the machine readable instructions of the flowchart(s) of FIG. 3 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIG. 3 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIG. 3 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart(s) of FIG. 3 to perform first operation(s)/function(s), the FPGA circuitry 800 of FIG. 8 may be configured and/or structured to perform second operation(s)/function(s) corresponding to a second portion of the machine readable instructions represented by the flowchart of FIG. 3, and/or an ASIC may be configured and/or structured to perform third operation(s)/function(s) corresponding to a third portion of the machine readable instructions represented by the flowchart of FIG. 3.

It should be understood that some or all of the circuitry of FIG. 2 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 2 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

From the foregoing, it will be appreciated that example systems, apparatus, articles of manufacture, and methods have been disclosed that enable pressure vessels to pressure control systems that facilitate lighter vessel geometries. Example pressure control systems disclosed herein determine the MOP of pressure vessels dynamically as a function of temperature. Examples disclosed herein enable lighter and thinner pressure vessels while ensuring the pressure vessels are structurally sound and operate within industry safety factors in all operating conditions. Examples disclosed herein are suitable for applications where pressure vessel weight is a significant design consideration, such as aviation. The reduced material thickness of the pressure vessels disclosed herein also reduces the cost of the pressure vessels disclosed herein.

Methods and apparatus for pressure control systems in pressure vessels are disclosed herein. Further aspects are provides by the subject matter of the following clauses:

An apparatus comprising a cryogenic tank, a valve fluidly coupled to the cryogenic tank, machine readable instructions, and programmable circuitry to at least one of instantiate or execute the machine readable instructions to determine, based on a temperature of the cryogenic tank and a property of the cryogenic tank, a threshold pressure of the cryogenic tank, compare a pressure of the cryogenic tank to the threshold pressure, and after determining the pressure of the cryogenic tank does not satisfy the threshold pressure, actuate the valve until the pressure satisfies the threshold pressure.

The apparatus of any preceding clause, wherein the programmable circuitry is further to detect a transient operation of the cryogenic tank.

The apparatus of any preceding clause, wherein the programmable circuitry is further to determine a first threshold rate of change of the pressure, and in response to determining that a rate of change of the pressure of the cryogenic tank does not satisfy the first threshold rate of change of the pressure, actuate the valve until the rate of change of the pressure satisfies the first threshold rate.

The apparatus of any preceding clause wherein the valve is a first valve, and further includes a second valve fluidly coupled to the cryogenic tank, and wherein the programmable circuitry is further to determine a second threshold rate of change of pressure, and in response to determining (1) a rate of change of the pressure of the cryogenic tank does not satisfy the second threshold rate of change and (2) the first valve is open, open the second valve.

The apparatus of any preceding clause, wherein the second threshold rate of change corresponds to a rate of pressure reduction of the cryogenic tank.

The apparatus of any preceding clause, wherein (1) the valve is a modulated valve having a closed position, a first open position, and a second open position, (2) the programmable circuitry is to, in response to determining that a rate of change of the pressure of the cryogenic tank does not satisfy the threshold pressure, open the valve by moving the modulated valve to the first open position from the closed position, and (3) the programmable circuitry is further to determine a second threshold rate of change of pressure, and after determining that the rate of change of the pressure of the cryogenic tank does not satisfy the second threshold rate, move the modulated valve from the first open position to the second open position.

The apparatus of any preceding clause, wherein the cryogenic tank is a hydrogen tank.

A non-transitory machine readable storage medium comprising instructions to cause programmable circuitry to at least determine, based on a temperature of a cryogenic tank and a property of the cryogenic tank, a threshold pressure of the cryogenic tank, compare a pressure of the cryogenic tank to the threshold pressure, and after determining the pressure of the cryogenic tank does not satisfy the threshold pressure, actuate a valve fluidly coupled to the cryogenic tank until the pressure satisfies the threshold pressure.

The non-transitory machine readable storage medium of any preceding clause, wherein the instructions cause the programmable circuitry to detect a transient operation of the cryogenic tank.

The non-transitory machine readable storage medium of any preceding clause, wherein the instructions cause the programmable circuitry to determine a first threshold rate of change of the pressure, and in response to determining that a rate of change of the pressure of the cryogenic tank does not satisfy the first threshold rate of change of the pressure, actuate the valve until the rate of change of the pressure satisfies the first threshold rate.

The non-transitory machine readable storage medium of any preceding clause, wherein the valve is a first valve, and wherein the instructions cause the programmable circuitry to determine a second threshold rate of change of pressure, and in response to determining (1) a rate of change of the pressure of the cryogenic tank does not satisfy the second threshold rate of change and (2) the first valve is open, open a second valve fluidly coupled to the cryogenic tank.

The non-transitory machine readable storage medium of any preceding clause, wherein the second threshold rate of change corresponds to a rate of pressure reduction of the cryogenic tank.

The non-transitory machine readable storage medium of any preceding clause, wherein (1) the valve is a modulated valve having a closed position, a first open position, and a second open position, (2) the instructions cause the programmable circuitry is to, in response to determining that a rate of change of the pressure of the cryogenic tank does not satisfy the threshold pressure, open the valve by moving the modulated valve to the first open position from the closed position, and (3) the instructions cause the programmable circuitry to determine a second threshold rate of change of pressure, and after determining that the rate of change of the pressure of the cryogenic tank does not satisfy the second threshold rate, move the modulated valve from the first open position to the second open position.

The non-transitory machine readable storage medium of any preceding clause, wherein the cryogenic tank is a hydrogen tank.

A method comprising determining, based on a temperature of a cryogenic tank and a property of the cryogenic tank, a threshold pressure of the cryogenic tank, comparing a pressure of the cryogenic tank to the threshold pressure, and after determining the pressure of the cryogenic tank does not satisfy the threshold pressure, actuating a valve fluidly coupled to the cryogenic tank until the pressure satisfies the threshold pressure.

The method of any preceding clause, further including detecting a transient operation of the cryogenic tank.

The method of any preceding clause, further including determining a first threshold rate of change of the pressure, and in response to determining that a rate of change of the pressure of the cryogenic tank does not satisfy the first threshold rate of change of the pressure, actuating the valve until the rate of change of the pressure satisfies the first threshold rate.

The method of any preceding clause, wherein the valve is a first valve, and further including determining a second threshold rate of change of pressure, and in response to determining (1) a rate of change of the pressure of the cryogenic tank does not satisfy the second threshold rate of change and (2) the first valve is open, opening a second valve fluidly coupled to the cryogenic tank.

The method of any preceding clause, wherein the second threshold rate of change corresponds to a rate of pressure reduction of the cryogenic tank.

The method of any preceding clause, wherein (1) the valve is a modulated valve having a closed position, a first open position, and a second open position and (2) the opening of the valve in response to determining that a rate of change of the pressure of the cryogenic tank does not satisfy the threshold pressure includes moving the modulated valve to the first open position from the closed position and further including determining a second threshold rate of change of pressure, and after determining that the rate of change of the pressure of the cryogenic tank does not satisfy the second threshold rate, moving the modulated valve from the first open position to the second open position.

The following claims are hereby incorporated into this Detailed Description by this reference. Although certain example systems, apparatus, articles of manufacture, and methods have been disclosed herein, the scope of coverage of this disclosure is not limited thereto. On the contrary, this disclosure covers all systems, apparatus, articles of manufacture, and methods fairly falling within the scope of the claims.

What is claimed is:

1. An apparatus comprising:

a cryogenic tank;

a valve fluidly coupled to the cryogenic tank;

machine readable instructions; and programmable circuitry to at least one of instantiate or execute the machine readable instructions to:

determine, based on a temperature of the cryogenic tank and a property of the cryogenic tank, a threshold pressure of the cryogenic tank;

determine a threshold rate of change of pressure of the cryogenic tank;

compare a current pressure of the cryogenic tank to the threshold pressure; and after determining that one of (a) the current pressure of the cryogenic tank does not satisfy the threshold pressure or (b) a current rate of change of the pressure of the cryogenic tank does not satisfy the threshold rate of change, actuate the valve until the current pressure satisfies the threshold pressure and the current rate of change satisfies the threshold rate of change.

2. The apparatus of claim 1, wherein the programmable circuitry is further to detect a transient operation of the cryogenic tank.

3. The apparatus of claim 1, wherein the threshold rate of change is a first threshold rate of change, the valve is a first valve, and further including a second valve fluidly coupled to the cryogenic tank, and wherein the programmable circuitry is further to:

determine a second threshold rate of change of the pressure; and in response to determining (1) the current rate of change of the cryogenic tank does not satisfy the second threshold rate of change and (2) the first valve is open, open the second valve.

4. The apparatus of claim 3, wherein the second threshold rate of change corresponds to a rate of pressure reduction of the cryogenic tank.

5. The apparatus of claim 1, wherein the threshold rate of change of pressure is a first threshold rate of change, (1) the valve is a modulated valve having a closed position, a first open position, and a second open position, (2) the programmable circuitry is to, in response to determining that the current rate of change does not satisfy the first threshold rate of change, open the modulated valve by moving the modulated valve to the first open position from the closed position, and (3) the programmable circuitry is further to:

determine a second threshold rate of change of the pressure; and after determining that the current rate of change does not satisfy the second threshold rate of change, move the modulated valve from the first open position to the second open position.

6. The apparatus of claim 1, wherein the cryogenic tank is a hydrogen tank.

7. A non-transitory machine readable storage medium comprising instructions to cause programmable circuitry to at least:

determine, based on a temperature of a cryogenic tank and a property of the cryogenic tank, a threshold pressure of the cryogenic tank;

determine a threshold rate of change of pressure of the cryogenic tank;

compare a current pressure of the cryogenic tank to the threshold pressure; and after determining that one of (a) the current pressure of the cryogenic tank does not satisfy the threshold pressure or (b) a current rate of change of the pressure of the cryogenic tank does not satisfy the threshold rate of change, actuate a valve fluidly coupled to the cryogenic tank until the current pressure satisfies the threshold pressure and the current rate of change satisfies the threshold rate of change.

8. The non-transitory machine readable storage medium of claim 7, wherein the instructions cause the programmable circuitry to detect a transient operation of the cryogenic tank.

9. The non-transitory machine readable storage medium of claim 7, wherein the valve is a first valve, the threshold rate of change is a first threshold rate of change, and wherein the instructions cause the programmable circuitry to:

determine a second threshold rate of change of the pressure; and in response to determining (1) the current rate of change does not satisfy the second threshold rate of change and (2) the first valve is open, open a second valve fluidly coupled to the cryogenic tank.

10. The non-transitory machine readable storage medium of claim 9, wherein the second threshold rate of change corresponds to a rate of pressure reduction of the cryogenic tank.

11. The non-transitory machine readable storage medium of claim 7, wherein the threshold rate of change of pressure is a first threshold rate of change, (1) the valve is a modulated valve having a closed position, a first open position, and a second open position, (2) the instructions cause the programmable circuitry is to, in response to determining that the current rate of change of the pressure does not satisfy the first threshold rate of change, open the modulated valve by moving the modulated valve to the first open position from the closed position, and (3) the instructions cause the programmable circuitry to:

determine a second threshold rate of change of the pressure; and after determining that the current rate of change does not satisfy the second threshold rate of change, move the modulated valve from the first open position to the second open position.

12. The non-transitory machine readable storage medium of claim 7, wherein the cryogenic tank is a hydrogen tank.

13. A method comprising:

determining, based on a temperature of a cryogenic tank and a property of the cryogenic tank, a threshold pressure of the cryogenic tank;

determining a threshold rate of change of pressure of the cryogenic tank;

comparing a current pressure of the cryogenic tank to the threshold pressure; and after determining that one of (a) the current pressure of the cryogenic tank does not satisfy the threshold pressure or (b) a current rate of change of the pressure of the cryogenic tank does not satisfy the threshold rate of change, actuating a valve fluidly coupled to the cryogenic tank until the current pressure satisfies the threshold pressure and the current rate of change satisfies the threshold rate of change.

14. The method of claim 13, further including detecting a transient operation of the cryogenic tank.

15. The method of claim 13, wherein the threshold rate of change is a first threshold rate of change, the valve is a first valve, and further including:

determining a second threshold rate of change of the pressure; and in response to determining (1) the current rate of change does not satisfy the second threshold rate of change and (2) the first valve is open, opening a second valve fluidly coupled to the cryogenic tank.

16. The method of claim 15, wherein the second threshold rate of change corresponds to a rate of pressure reduction of the cryogenic tank.

17. The method of claim 13, wherein the threshold rate of change of pressure is a first threshold rate of change, (1) the valve is a modulated valve having a closed position, a first open position, and a second open position and (2) the opening actuating of the modulated valve in response to determining that the current rate of change does not satisfy the first threshold rate of change includes moving the modulated valve to the first open position from the closed position, and further including:

determining a second threshold rate of change of the pressure; and after determining that the current rate of change does not satisfy the second threshold rate of change, moving the modulated valve from the first open position to the second open position.

* * * * *